Patented Oct. 20, 1931

1,827,838

UNITED STATES PATENT OFFICE

THOMAS S. CURTIS, OF HUNTINGTON PARK, CALIFORNIA, ASSIGNOR TO VITREFRAX CORPORATION, OF HUNTINGTON PARK, CALIFORNIA

HIGH STRENGTH CERAMIC COMPOSITION

No Drawing. Application filed June 26, 1928. Serial No. 288,534.

In the art of ceramic compositions of the porcelain class, such as those employed in the manufacture of electric insulators, properties of hardness, toughness, and strength in the finished product are limited by the like properties of the constituents of the composition as would naturally be expected. Heretofore, mullite or quartz fragments have been almost universally availed of in view of their ability of becoming united with glass or other cementitious agent, to provide the desired vitreous mass. Under these conditions, the essential properties of the products above noted, naturally partake of the properties of the binding agent employed, which in most cases, fall considerably beneath the corresponding characteristics of mullite. Certain developments have been made to the end of attaining ceramic compositions of this class of increased hardness, but these developments have always taken the trend of providing intercrystalline or interlocking mullite, usually of the type disclosed in my co-pending applications Serial No. 156,253 filed December 21, 1926. However, under conditions providing even the best of results, the hardness, toughness, and strength of the ultimate product are dependent upon the hardness of mullite itself which is placed on the Moh scale approximately at 8.

Having taken recognition of the desirable characteristics of corundum as the major constituent of a ceramic composition of this class, the principal object of this invention in view is to provide such a ceramic composition in which corundum is the major constituent and which composition partakes of the properties of corundum itself. The hardness of corundum on the Moh scale is placed at about 9, and the associated properties of toughness and strength are correspondingly superior to these properties of mullite. In fact this substance is exceeded in hardness in known substances only by the diamond itself. The use of corundum in ceramic compositions of the class described imparts to such compositions a heretofore unattainable modulus of rupture and tensile strength together with a very high resistance to thermal effects.

The actual embodying of the object noted in the preceding paragraph in a ceramic composition is surrounded with an exceedingly large number of difficulties which assume the utmost importance. In the first place, it is to be remembered that no vitreous cementitious substance or bonding agent may be availed of because if they were, then the finished product would be limited in hardness to the corresponding property of the bonding agent and would not partake of the hardness of the corundum crystals. In the abrasive industry, problems similar to those presented to me do not arise because in that art whatever the bonding agent availed of for holding the corundum crystals together is immaterial inasmuch as the corundum crystals are present only for their grinding or cutting action. Even when abrasives which are molded and fired products are manufactured, the strength and toughness of the finished article has not been equal to that of the corundum crystals itself; these features being dependent, as previously noted, on the bonding agent employed, and if such agent be glass or a like vitreous bond, then the product will not have the properties of strength, toughness, et cetera, to a degree the attaining of which is the object of this invention.

My aim therefore has been to provide a ceramic composition consisting of a mass of corundum crystals which are interlocked together in a so-called mosaic pattern to provide the essential union between the said corundum crystals. In obtaining this interlocked, crystalline structure of the corundum crystals, I avail of a process of recrystallization of the corundum for the obtaining of the desired result.

While the recrystallization of ground alumina oxide is in itself a comparatively simple step which may be carried out by subjecting it to a sufficiently high temperature of an electric furnace or like heating medium, the product resulting from the recrystallization carried out in such a manner, is found to be extremely susceptible to great internal stresses because of the shrinkage of the product from its molded size to its fired size, and also because of the lack of habit or system of the crystals in assuming interlocked positions in the recrystallized structure. Where the articles to be made are small, the question of shrinkage does not take on such a position of importance as it does under conditions where the articles to be made are larger.

A particular object of the invention therefore is to provide means for controlling or governing the recrystallizing action of corundum crystals. Having faith in the thought that some substance might be found that would act as a mineralizing agent when added to the alumina oxide in proper proportion and thus influence the habits of crystallization to the desired degree, I have made extended research to investigate the effects of various elements, earths and oxides when added in small fractions of a per cent to the ground alumina oxide. As a result of these investigations, I have discovered that the oxides of cobalt and nickle have the desired effect when added in proper proportions, as above noted, with cobaltic oxide perhaps affording the better result as compared with the action of nickelous oxide. These oxides have a material effect and exert a most profound influence upon the habits of crystals when added in so small a proportion as one tenth of one percent of the whole.

It will be understood that while natural corundum is the material primarily employed in this invention, artificial alumina, which has the same chemical composition as the natural corundum, may also be employed.

A particular noteworthy feature of the invention lies in the incorporation into alumina oxide crystals of cobaltic oxide in proper proportion to control the habit of crystallization to a desired extent, and also in the processess associated and interrelated with this controlling of the crystallizing action.

When a ceramic composition is made, as previously set forth, there still may be present traces of glass or other silicates, but their presence is merely incidental, and they do not provide the binding or uniting effect which is so essential to the ultimate product. Microscopic examinations of fragments of ceramic compositions made in accordance with this invention establishes the fact that this condition is true. During such examination, I have noted that the cobaltic aluminum composition consists of elongated tabular corundum crystals closely packed together in an interlocked mass and welded at the peripheries by a glass, which is evident on account of the presence of silicates in practically all aluminum oxide ore with virtually all the cobalt added by the process of carrying out this invention entering into the composition of the glass rather than the corundum crystals.

As further evidence that the union is created by the recrystallization rather than the presence of any cementing or bonding agent, tests involving the crushing of the hardened and crystallized body under a pestle and subsequent examinations establish the tendency of the crystals to break apart at their boundaries rather than to fracture through their intermediate portions, which would be the case were the binding effect due to a binding agent.

The mode of controlling the habit of recrystallization above noted, is adequate for providing ceramic articles of this type having the requisite properties set forth when such articles are comparatively small, because in such cases the action of shrinkage does not assume the paramount importance which it does when the products are of larger dimensions. The manufacture of ceramic products of this type involves a final step of firing which is accompanied by the shrinkage due to the thermal effect. Now then I propose to do away with the deteriorating effect of the firing step by incorporating into the material to be molded a relatively large percentage of ground material of the same composition which has previously been calcined or fired. The percentage of this calcine, grain size thereof, and degree of temperature in the pre-firing of the same, are all dependent upon the size and shape of the article to be produced and will vary under different conditions. The final step of firing the product which is being made, when the composition includes a pre-fired batch of the composition as above noted, does not entail a harmful shrinkage as would otherwise be the case. Furthermore, the resulting product is completely and homogeneously crystallized without leaving the slightest trace of the original particles or pre-calcined substance.

An alternative which may be resorted to and which is preferable in many instances for the elimination of the shrinkage effect of the firing, lies in the addition in proper proportion of crypto-crystalline corundum such as disclosed and described in my co-pending application, Serial No. 288,532, filed June 26, 1928 in which I utilize aluminum oxide such as refined concentrate containing 98% $Al_2O_3$. This is fed into an electric furnace comprising two electrodes arranged at right angles to form an electric arc when current passes therethrough, into which arc the concentrate is fed, being thus melted, and falling when melted into a stream of water which shatters and quenches the molten alumina oxide, producing the desired crypto-crystalline alumina oxide.

Another noteworthy feature of the invention resides in certain manufacturing advantages of my novel ceramic composition. More particularly, I note that while the maturing point of the composition ranges from ceramic cone 30, the point at which crystallization is initiated, and first clearly developed in a very fine state, to ceramic cone 40, where crystallization reaches a maximum and at which degree of crystallization the very greatest strength is realized in the ultimate product, the actual melting point is between ceramic cones 41 and 42. The manufacturing importance of this is readily appreciable when the situation is stated in somewhat different language, as follows: The body has a maturing point just beneath critical "flame temperature", while it has a melting point just above "flame temperature". It is therefore commercially impossible to overfire or to develop a vesicular structure due to over-firing in a furnace heated by the burning of carbonaceous fuel. This characteristic has the further advantage of permitting complete recrystallization which is equivalent to complete vitrification in a glassy porcelain without danger of overfiring, as is the case of vitreous bodies when they are heated beyond the maturing point.

With these and other objects and advantages in view, as will in part become apparent and in part be hereinafter stated, the invention comprises certain novel compositions which will be developed as the description of the invention proceeds.

While a preferred specific embodiment of the invention is herein set forth, it is to be understood I am not to be limited to the exact combinations of elements, compositions and substances described, because various modifications of the details may be provided in putting the invention into practice with the purview of the appended claims.

The particular method by which my invention may be practiced to provide a ceramic composition of the desired type, may vary according to the size and shape of the finished article to be produced, and in accordance with other associated conditions. One method in which my invention may be carried out is substantially as follows: A mixture consisting of one to two-tenths of one percent cobaltic oxide and 99.9 to 99.8 percent of precipitated aluminum oxide is charged into a pebble mill and sufficient water is added to provide a viscosity of the nature of thin cream. The mill is then operated for the required length of time to reduce the composition to a fine state of subdivision, so that substantially all of the granular alumina will pass a 200 mesh screen; depending of course upon the size of the mill, the size of the charge and other conditions, this operation will take from 16 to 48 hours.

The cobaltic alumina slip thus formed may be cast directly into plaster molds preferably after having the vacuum treatment described in my co-pending application for "ceramic composition and process of making," Serial No. 148,708, filed Nov. 16, 1926, and introduced into the molds under pressure and vibration as disclosed in the identified application.

Another method of carrying out the molding step is to partially de-water the composition and form into the desired shape by availing of hydraulic pressure. After drying in the conventional manner, the article is baked in a kiln to approximately ceramic cone 7 which renders it to a condition sufficient to stand subsequent handling, but not too hard to prohibit finishing operations from taking place thereon. Such operations may lie in trimming, drilling, threading or turning to desired shape the article coming from the kiln.

Subsequent to these finishing operations, the article is subjected to a final heat treating or firing step which may take place in a converter substantially of the type disclosed in the United States Patent No. 1,662,739, issued March 13th, 1928, to Curtis. This firing step involves the heating of the article to a temperature somewhere between ceramic cones 30 and 40 with the last temperature preferably being reached to provide the maximum crystallization.

When the article to be produced is of comparatively large dimensions, the process of manufacture will include a step of calcining the composition of aluminum oxide and cobaltic oxide, as above noted, to a temperature of about ceramic cone 17 and the addition of the product resulting from the calcining step to a mixture of aluminum oxide and cobaltic oxide together with proper grinding operation. Along somewhat the same line, if desired, crypto-crystalline aluminum in proper proportions may be added to the mixture of cobalt and aluminum oxides.

Having thus described my invention, what I claim as new and desire to secure by Letters Patent of the United States, is:

1. A ceramic composition of the class described, consisting of corundum and cobaltic oxide.

2. A ceramic composition of the class described, comprising, in combination, alumina oxide of about approximately 99.8 per cent, and cobaltic oxide of approximately .2 per cent.

3. A ceramic composition of the class described, consisting of aluminum oxide in crystalline form and cobaltic oxide in proper proportion to control the habit of the recrystallization of the substance during recrystallizing action.

4. A ceramic composition of the class described comprising, in combination, corundum crystals, cobaltic oxide and a precalcined composition of corundum crystals and cobaltic oxide.

5. A ceramic composition of the class described, comprising a fired mass of corundum and cobaltic oxide, the cobaltic oxide being present in amounts sufficient to control the habit of the crystallization of the corundum during recrystallizing action, the resulting cobaltic aluminum composition comprising elongated tabular corundum crystals closely packed together in an interlocked mass.

6. A refractory composition of the class described, consisting of substantially pure aluminum oxide and cobaltic oxide.

7. In a refractory composition of the class described, the combination with aluminum oxide, of about 99.8%, of cobaltic oxide of approximately 0.2%.

8. A refractory composition of the class described, comprising, in combination, aluminum oxide crystals, cobaltic oxide, and a pre-calcined composition of aluminum oxide and cobaltic oxide.

9. The process of preparing a refractory which comprises adding cobaltic oxide to aluminum oxide, grinding and mixing the same, and then firing the mixture to a temperature below the fusing point of the aluminum oxide.

10. A refractory composition of the class described, comprising, in combination, substantially pure aluminum oxide, and cobaltic oxide in quantities sufficient to control the crystallization of the aluminum oxide upon the composition being heated at temperatures lower than the fusing point thereof.

11. A refractory composition of the class described, comprising substantially pure aluminum oxide and cobaltic oxide in proper proportion to control the action of recrystallization of the aluminum oxide during the recrystallization thereof.

12. The process of preparing a refractory which comprises intermingling substantially pure aluminum oxide with cobaltic oxide, pre-firing a portion of the mixture, mixing the fired and unfired portions of the mixture, and then firing the mixture to a temperature below the fusing point thereof.

13. A ceramic composition of the class described, comprising corundum and cobaltic oxide, the corundum being in the form of tabular crystals.

In testimony whereof I affix my signature.

THOMAS S. CURTIS.